Feb. 23, 1937.    A. WEILAND    2,071,366
FABRICATED STRUCTURE FOR AIR CONDITIONING UNITS
Filed June 29, 1933    6 Sheets-Sheet 1

INVENTOR
A. WEILAND
BY
*Edward M. Hathaway*
ATTORNEY

Feb. 23, 1937. A. WEILAND 2,071,366
FABRICATED STRUCTURE FOR AIR CONDITIONING UNITS
Filed June 29, 1933 6 Sheets-Sheet 2

INVENTOR
A. WEILAND
ATTORNEY

Feb. 23, 1937. A. WEILAND 2,071,366
FABRICATED STRUCTURE FOR AIR CONDITIONING UNITS
Filed June 29, 1933 6 Sheets-Sheet 4

INVENTOR
A. WEILAND
BY
ATTORNEY

Feb. 23, 1937. A. WEILAND 2,071,366
FABRICATED STRUCTURE FOR AIR CONDITIONING UNITS
Filed June 29, 1933 6 Sheets-Sheet 5

INVENTOR
A. WEILAND
BY

ATTORNEY

Fig. 12

Patented Feb. 23, 1937

2,071,366

UNITED STATES PATENT OFFICE 2,071,366

FABRICATED STRUCTURE FOR AIR CONDITIONING UNITS

Alfred Weiland, Philadelphia, Pa., assignor to Baldwin-Southwark Corporation, a corporation of Delaware Application June 29, 1933, Serial No. 678,242

23 Claims. (Cl. 62—129)

This invention relates generally to an improved fabricated structure for supporting and housing refrigerating and air circulating mechanism of an air conditioning room cooler unit preferably of the self-contained type and relates more particularly to an improved arrangement and form of component elements especially adapted to permit comparatively thin sheet metal to be used in such a manner as to provide a relatively simple, economical and compact structure having a high degree of rigidity and strength while at the same time effectively providing walls for certain air passages through the unit.

One object of my invention is to accomplish the foregoing desirable results with improved forms of sheet metal elements whereby a relatively few of these elements may be arranged in a cooperating manner to form a fabricated structure of substantial character and yet have a high degree of simplicity and adaptability for quantity production at low cost.

A further object is to provide an improved sheet metal combined base and pan so formed that it has structural characteristics for resisting any torsional effects to which the unit may be subjected during shipping or moving and at the same time providing an effective means for individually supporting a compressor unit, a fan motor and sheet metal end standards.

Another object is to provide an improved form and arrangement of sheet metal elements that eliminates the necessity of usual structural angle and channel irons for supporting the refrigerating and air circulating mechanisms or their ducts while a further object in this respect is to provide improved sheet metal end standards for supporting a super-structure including elements such as the condenser, evaporator and air ducts therefor.

In one specific aspect of the invention I have provided an improved arrangement for supporting a fan casing on one side of an end standard, and preferably have each end standard carry a fan casing on its inner surface. More specifically in this respect I have provided sheet metal end standards which serve not only as a standard but also function as one side of the fan casing, thereby considerably simplifying the fan structure, and the assembly thereof with the unit.

Still another object is to provide an improved arrangement between the sheet metal end standards and the air ducts for the condenser and evaporator and in one specific aspect of the invention I accomplish this by arranging the walls of these ducts so that they are supported by and between the end standards in the manner of a beam thereby permitting relatively thin sheet metal sides placed in vertical edgewise position to effectively assist in providing a strong and compact unit and if necessary to help support the super-structure elements. As a result of this improved construction the fan casing may, if desired, be supported entirely from these duct walls as by depending therefrom without necessarily attaching the fan casing to the end standards, although as will be seen hereinafter it is preferable for the purpose of maximum economy, simplicity and rigidity to have the fan casings secured to the sheet metal end standards. In a more specific aspect of this phase of the invention, it is desired preferably to have the standards also form the end walls of the ducts.

A further object is to provide an improved arrangement whereby the condenser and evaporator unit may be preferably arranged so as to be assembled separately from the ducts that are formed with the standards and thereafter the condenser-evaporator unit may be supported on the top of the duct and standard assembly, although if desired the sheet metal end standards and duct walls may be continued upwardly to form walls within which the condenser and evaporator coils may be disposed.

From the foregoing it is seen that, generally stated, an object of my invention is to have sheet metal elements not only so formed and so interrelated for cooperation to provide a strong unitary structural support for the various mechanical devices to be carried thereby but also to cause the sheet metal elements to function effectively and simply as walls for various air passages, although it will of course be appreciated by those skilled in the art that certain features and arrangement of parts of my invention may be omitted or otherwise altered without departing from the principles of the invention as hereinafter set forth in the following description of the accompanying drawings wherein:

Figure 1:
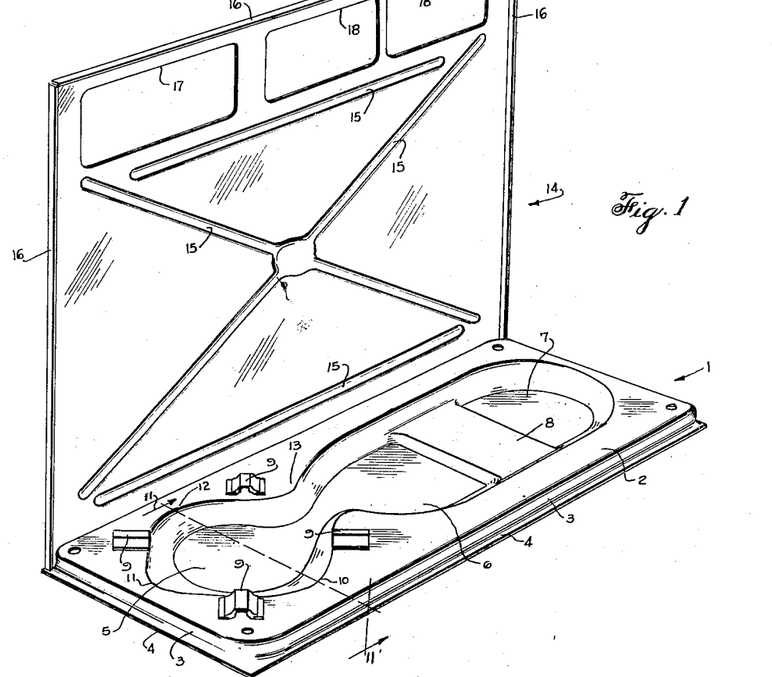
Fig. 1 is a perspective of the combined base and pan with a backplate secured thereto, all other parts of the unit being removed.

In the illustrated embodiments of the invention which are shown herein merely for the purpose of disclosing certain specific forms among possible others that the invention might take, in practice I have provided as shown in Fig. 1 a sheet or plate metal base generally indicated at 1 having a raised platform 2 conforming in outline substantially to the full length and width of the base. Pressed downwardly around the edges of the raised platform are sides 3 terminating preferably in a slightly horizontal flange 4. The platform, sides 3 and flanges 4 are connected preferably with rounded corners of relatively large radius. To produce an extremely strong base with comparatively thin metal and also to effectively provide a supporting base for various elements such as the compressor, fan motor and end standards, I create a double channel effect by depressing or dishing in the longitudinal central portion of the base. One such recessed portion is provided at 5 to receive a compressor while other portions at 6 and 7 are provided with an intermediate semi-raised platform 8 to support a fan motor.

Figure 11:
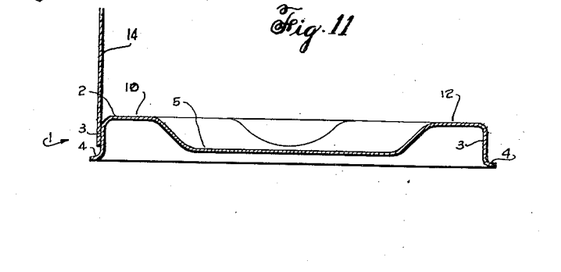
Fig. 11 is a sectional view of the pan taken on line 11—11 of Fig. 1.

The recess or depression 5 is preferably so shaped in plan view as to permit a series of compressor supports 9 to be supported on platform 2 in relatively close relation to the compressor body. To effect this, the depression 5 is formed roughly as a square with the corners thereof more nearly adjacent the sides and end of the pan as shown at 10, 11 and 12 while a necked portion 13 joins the walls of depression 6. As shown more clearly in Fig. 11, the foregoing arrangement presents a substantially channel construction along each side and end of the base thus giving the double channel effect. Also this channel construction is so arranged as to inherently provide desirable recesses or supporting surfaces for the various operating elements thereby allowing the base to perform several functions in an economical and simple manner.

Figures 9, 10, 13:
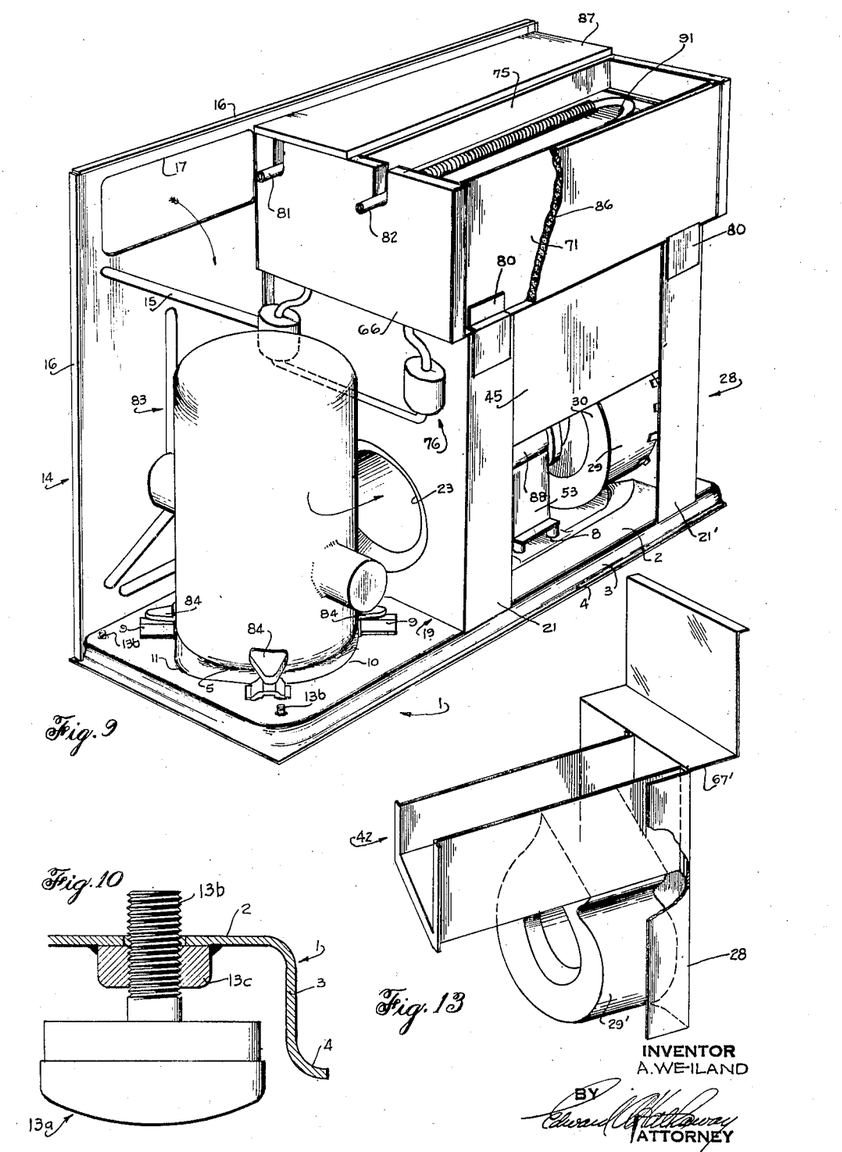
Fig. 9 is a perspective of the completely assembled unit embodying the features of my invention.
Fig. 10 is a sectional detail showing the manner in which my improved base is adapted to adjustably support a glide.
Fig. 13 is a perspective of a modified arrangement wherein the fan is supported only by the duct which in turn is supported by the end standard.

My improved base is further adapted in a simple and effective manner to be supported in spaced relation to the floor or suitably leveled by the provision of a plurality of glides 13a having a stem 13b adjustably threaded in a nut 13c. This nut is welded or otherwise secured preferably to the under side of platform portion 2 of the base. The glides are placed preferably at the four corners of the base although they may be placed to give a three point suspension.

The rearmost vertical side of the base further provides a relatively simple and effective means for securing a backplate 14 thereto, preferably made of sheet metal having any suitable arrangement of end flanges 16 or stiffening corrugations shown, for example, at 15. This improved back also provides one wall of certain air ducts of the unit whereby air is conducted inwardly to the unit through a suitable inlet opening 17 and thence outwardly through an inlet 18 preferably provided with an intermediate strengthening rib. It will be understood that the unit herein disclosed is preferably of the self-contained air cooled condenser type wherein outside air for cooling the condenser is circulated through suitable ducts connected to a window or other opening in a room wall.

Figures 2, 3:
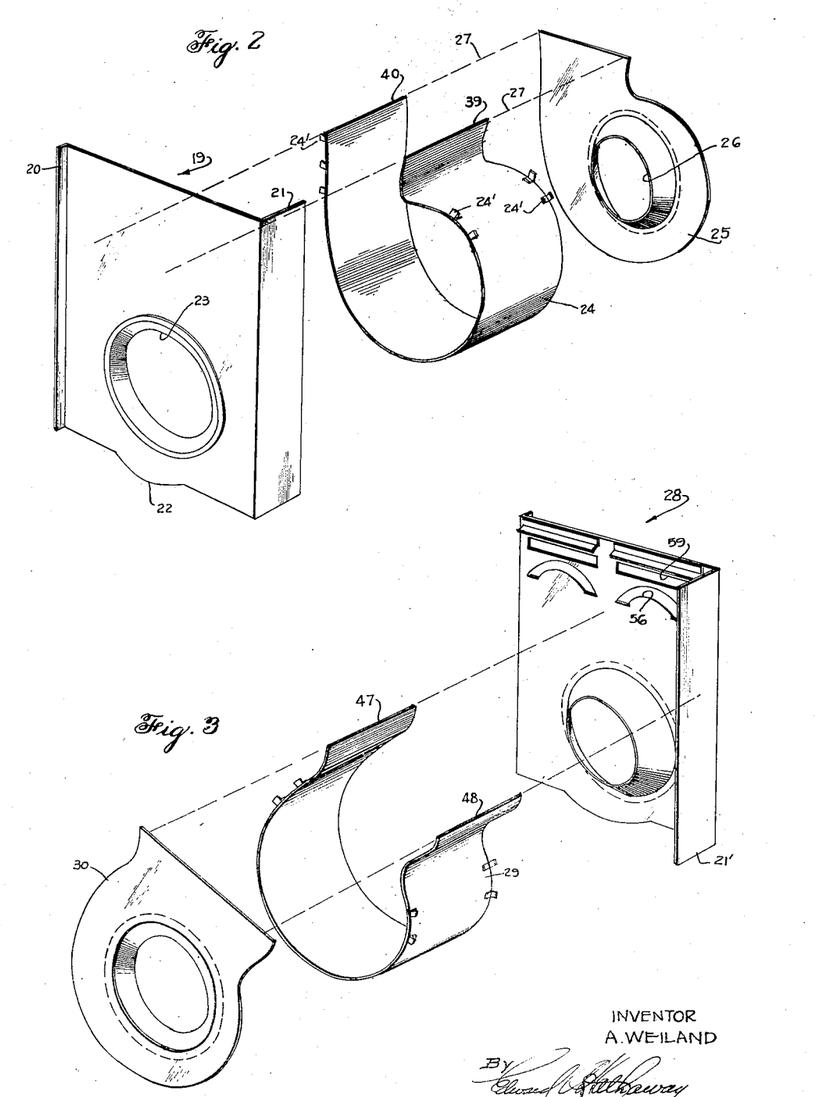
Fig. 2 is a perspective of one of the sheet metal standards together with the elements of a fan casing adapted to be assembled with the standard.
Fig. 3 is a view similar to Fig. 1 except to show the sheet metal end standard and fan scroll for the other end of the unit.

To permit sheet metal to be effectively used as end standards for supporting the evaporator, condenser and air ducts therefor, I have provided as shown in Fig. 2 a sheet metal plate 19 having preferably a relatively narrow flange 20 and a relatively wide flange 21, although these widths may be varied to suit circumstances. The lower edge has preferably a slight curved projection 22 to extend downwardly into recess 6 of the base adjacent the neck 13. A fan inlet opening 23 with tapered sides may be formed either by pressing in the sheet metal to the form shown or a suitable separate annularly formed member may be secured to standard 19 and caused to project through a circular opening therein.

To permit a fan casing to be formed in a most simple manner, I take a flat piece of sheet metal of rectangular shape in blank form and then curve the same in the form of a scroll as shown at 24 in Fig. 2. There is also provided an end plate 25 for the scroll shaped to conform thereto and having if desired an inlet 26 formed similarly to inlet 23, although if the fan now being described is of the single inlet type, then inlet 26 may be omitted and the sheet metal end 25 provided only with a small shaft opening.

To effect a relatively simple support for the fan casing and also to effect a mutual stiffening action between the scroll and wide sheet metal end standards, I preferably place one edge of scroll 24 against the inner face of end standard 19. Fan plate 25 then covers the other end of the scroll. These three elements may be secured together in any suitable manner such as by butt welding, spot welding or by screws passing through flanges or tabs 24' secured to spaced points around scroll 24. While the end standard 19 thus serves to provide an end closure for the scroll, yet it also serves the further function of directly supporting the fan casing, and this function may be effected even though the end of the scroll adjacent the standard were closed with an end plate separate from the end standard. The end standard 19, scroll 24 and end plate 25 are however preferably assembled merely by bringing the same together along dotted lines 27.

The fan scroll above described is adapted for circulation of the outside air through the unit. To provide room air circulation there is provided an end standard and fan arrangement comprising a standard 28 constructed similarly in outline to standard 19 except that it is adapted for the right hand position while a fan scroll 29 formed of a plain piece of sheet metal is shaped to direct flow of air toward the front of the unit rather than to the rear as is the case for scroll 24. These scrolls are adapted to have fan rotors rotate in the same direction which explains the reason for having scroll 29 pitched forwardly as shown. A cover plate 30 shaped to conform to scroll 29 is secured thereto and the scroll is secured against the inner face of standard 28 to form a complete fan casing supported by the standard. It is equally true that this arrangement, as with the Fig. 2 form, may employ an end piece for scroll 29 separate from the standard if for any reason it is desired not to have the standard form a closure for one end of the scroll, but in either event the end standard effectively functions to support the fan casing.

Figures 4, 5:
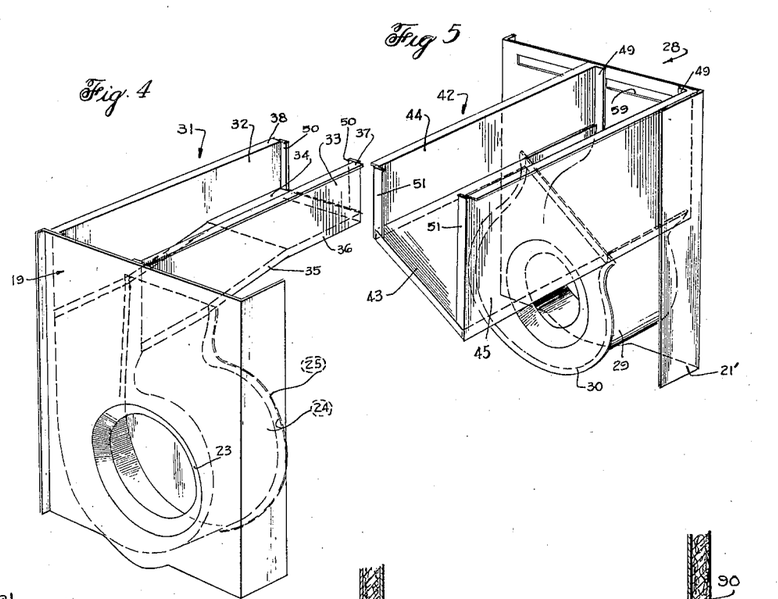
Fig. 4 is a perspective of the end standard or plate and fan scroll in Fig. 2 in their assembled relation with the addition of an air duct which communicates with the fan scroll.
Fig. 5 is a perspective of the end standard and fan scroll shown in Fig. 3 in their assembled relation together with an air duct communicating with the fan scroll.

After the fan scroll and end standard of Figs. 2 and 3 are assembled as units such as shown in Figs. 4 and 5 respectively, they are then preferably, but not necessarily, next assembled with air ducts one of which is generally indicates at 31. This duct may be formed from a single piece of sheet metal or from a plurality of pieces but in either event certain principles are embodied in accordance with the disclosure herein. For instance, duct 31 includes a pair of relatively deep preferably elongated sheet metal sides 32 and 33 secured at one end as by spot welding through flanges or other suitable securing means to end standard 19. A bottom 34 of duct 31 has preferably an inclined portion 35 terminating in a substantially horizontal portion 36. The lower edges of the sides 32 and 33 suitably conform to the inclined and horizontal portion of said bottom or floor although their upper edges are preferably substantially straight and horizontal and provided with flanged edges 37 and 38. The floor is substantially the width of the outlet of scroll 24 while the sides 32 and 33 extend along the outside of the edges 39 and 40 of scroll 24 and are secured thereto as by spot welding or other suitable means.

The fan scroll 29 after being assembled as a unit with end standard 41 is then provided with its room air duct 42 which it will be noted is connected to the front side of the end standard adjacent its relatively wide flange 21'. This duct may also be formed from a single piece of sheet metal or from a plurality of pieces but in either case it has preferably a transversely inclined bottom or floor 43, an inner side 44 and an outer side 45. The floor 43 is the same width as the outlet of fan scroll 29 and is secured to the top straight edge of fan end plate 30 in any suitable manner such for instance as by having a flange spot welded or otherwise secured to the side surface of plate 30. Likewise sides 44 and 45 are suitably secured to the outside edges 47, 48 of scroll 29. The sides 44 and 45 may be similarly secured by flanges 49 to end standard 28.

When the fan, end standards and ducts are assembled in the relative relation as shown in Figs. 4 and 5, it is seen that they provide in effect complementary fan and air duct units adapted to be brought into cooperating supporting relation merely by moving the same toward each other and securing duct 42 to the front side of end standard 19 and similarly securing duct 31 to the rear side of end standard 28. Any suitable means may be employed for securing said members together such for instance as the provision of flanges 50 and 51, on the respective ducts, to be spot welded or otherwise suitably secured to the adjoining standards.

Irrespective of the manner in which the foregoing elements may be formed or of the steps in which they may be assembled, it is seen that after they are assembled, the relatively thin sheet metal end standards provide exceptionally strong vertical supports and also effect an extremely simple manner of supporting the fan scrolls and in the specific aspect of the invention of assisting in the formation thereof. Also it is seen from Figs. 4, 5 and 12 that irrespective of whether the fan scrolls are supported by the end standards they are also adequately supported in depending relation from the beam-like construction of the air ducts 31 and 42 supported at their opposite ends by the end standards. Fan casings such as 29', Fig. 13, could therefore in accordance with this disclosure be supported wholly from said beam-like ducts in depending relation therefrom although it is preferable that the casings be secured to the end standards so that scrolls 24 and 29 may, in effect, provide stiffening ribs over the relatively wide comparatively thin sheet metal end standards.

Figure 7:
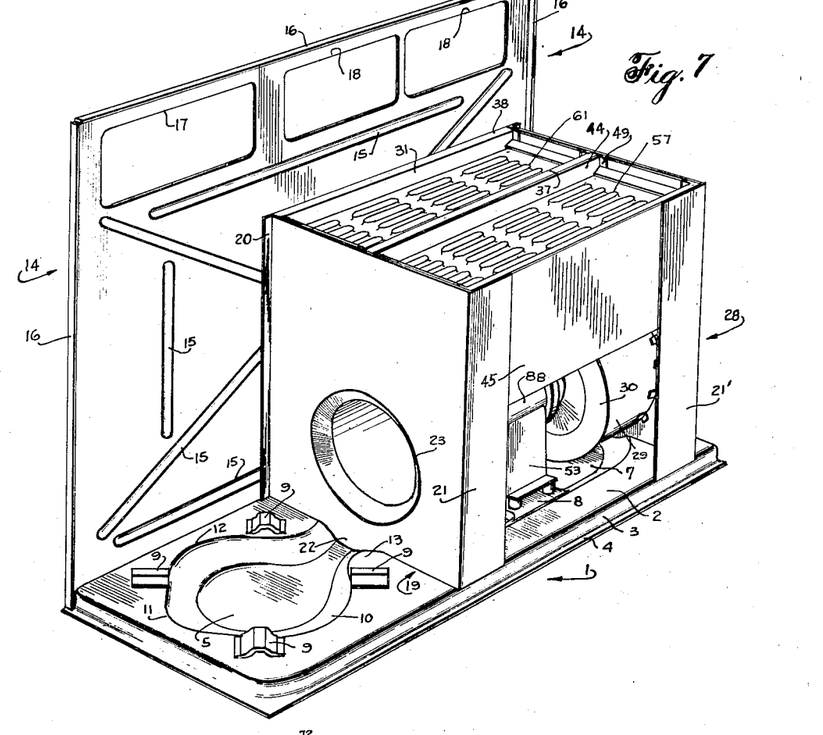
Fig. 7 is a perspective showing the assembly of the base pan, end standards and air circulating fans and ducts.

After the end standards, fans and ducts are assembled as a unit, the unit may be placed on the base pan as shown in Fig. 7. The lower edges of each of the end standards will rest directly on the raised platform 2 with the projections such as 22 extending downwardly into the necked depression 13, thereby providing a substantially closed juncture between the standard and the compressor end of pan 2 although for practical purposes this need not be a close fit except to define part of the outside air passage self-contained with the unit. The other standard 28 is similarly supported on the raised platform 2 adjacent the remote end of depression 7. These standards are then suitably secured to the base as, for instance, by welding along the lines of juncture therebetween or in any other suitable manner. Also the narrow flanges such as 20 of the end standards are suitably secured as by spot welding or otherwise to the backplate 14. From Figs. 4, 5, and 7 it is seen that the fan casings 24 and 29 are in a vertically spaced or elevated position from the base. Also from Fig. 7 it is seen that a fan motor support 53 is secured to the semi-raised platform 8 of base 1.

Figure 6:
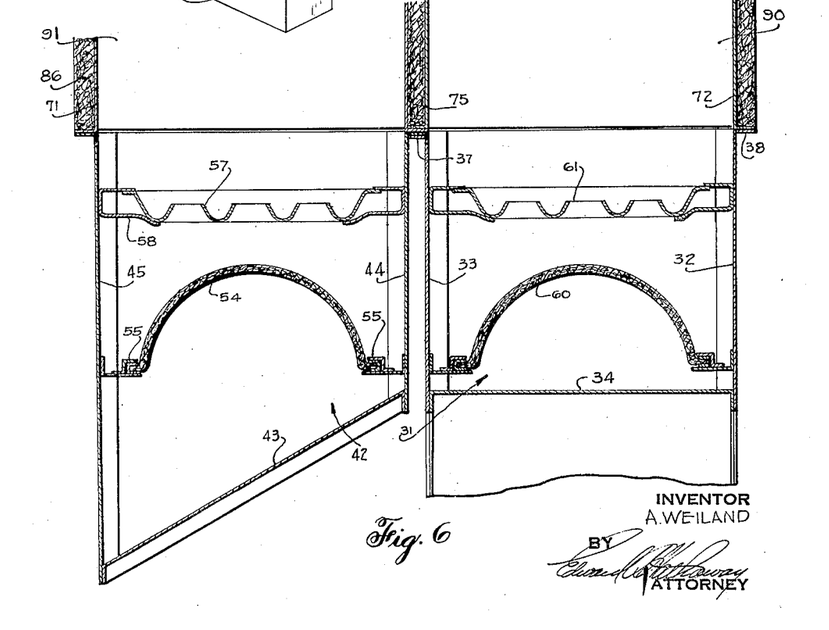
Fig. 6 is a transverse section through the ducts leading to the condenser and evaporator showing condensate disposal trays and filters.

It is preferable that suitable filter means and condensate collecting and disposal means be associated with the duct arrangement so far described. To accomplish this there is shown in Fig. 6 an arcuate filter 54 which extends longitudinally in duct 42 between the walls 44 and 45. The longitudinal guides 55 for this filter are suitably secured to walls 44 and 45 while, as shown in Fig. 3, an arcuate opening 56 is formed in end standard 28 to permit insertion or removal of the filter. The foregoing description of the filter arrangement will suffice as it does not per se constitute a part of my present invention. Similarly it will suffice to state that a suitable condensate tray 57 is longitudinally disposed within duct 42 between walls 44 and 45, suitable guides 58 likewise being connected to said walls for supporting said tray. As shown in Figs. 3 and 5, an opening 59 may be provided in end standard 28 to allow said tray to be inserted or removed from the duct unless it is immovably secured therein. A similar filter 60 and condensate tray 61 are provided for duct 42.

Figure 8:
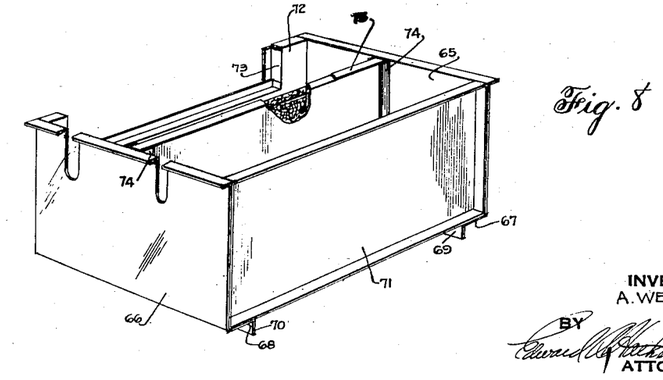
Fig. 8 is a perspective of the housing for the condenser and evaporator assembly.
Figure 12:
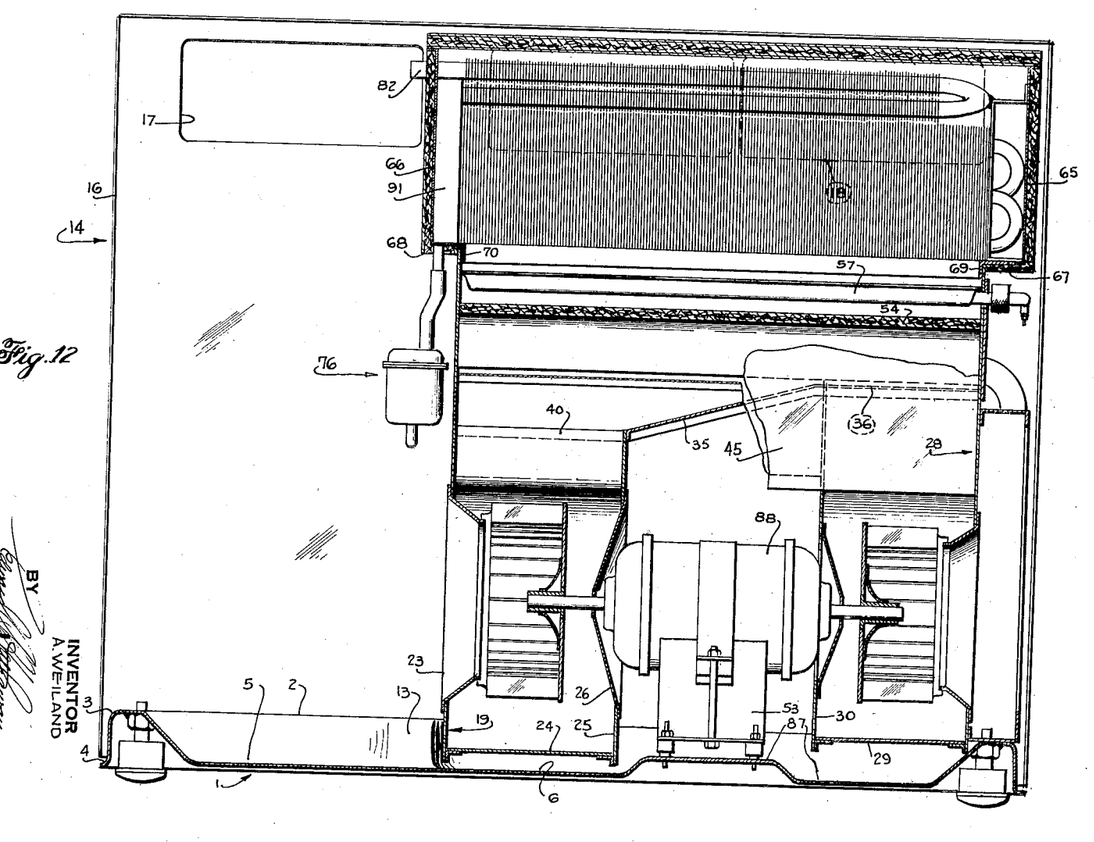
Fig. 12 is a vertical longitudinal section through the assembled unit.

An evaporator and condenser assembly unit includes, as shown in Fig. 8, sheet metal end plates 65 and 66 having inwardly turned horizontal portions 67 and 68 terminating in vertical flanges 69 and 70. Secured to said end members are sheet metal walls 71 and 72, wall 72 having a cut-out portion 73 adapted to register with opening 18 of backplate 14. Vertical guides 74 are secured to each of the end members 65 and 66 to receive a partition 75. Condenser and evaporator coil units may be constructed and shaped in any usual or suitable manner preferably to be received respectively within the spaces formed on each side of partition 75. These coils are suitably secured preferably to one or the other or both of end plates 65 or 66. A suitable expansion valve or trap system generally indicated at 76 is connected to the condenser and evaporator to form part of the evaporator-condenser unit. This unit is then placed on top of the duct assembly as shown in Figs. 7 and 12, the flanges 69 and 70 preferably engaging the inside surfaces of end standards 19 and 28 while the lower flanged edges of sides 71 and 72 rest upon the horizontal flanged edges such as 38 of ducts 31 and 42. The partition 75 may similarly rest on the flanged edges 37 of the intermediate duct wall 33 or 44. This condenser-evaporator unit may be secured in any suitable manner, one specific form of which is by a bracket 80 spot welded or otherwise suitably secured to the side walls 71 or 72 and to the wide flanges 21 and 21' of the end standards. The holding brackets 80 will prevent disarrangement of the elements during shipment or moving of the unit although it will of course be readily seen that if for any reason it is necessary to remove the condenser-evaporator assembly, this may be accomplished merely by loosening brackets 80 whether they are held in position by welding or screws. The condenser-evaporator assembly may be then lifted from the unit after the condenser and evaporator pipes 81 and 82 have been disconnected, as shown in Fig. 9, from the motor-compressor unit generally indicated at 83. The end standards and walls of ducts 31 and 42 may be extended upwardly to form side walls for the evaporator and condenser coils, thus eliminating the separate assembly unit therefor. The end standards, in this arrangement, if necessary would each be provided with an offset portion such as 67', Fig. 13, corresponding to 67 and 68 of Fig. 8.

The motor-compressor unit 83 is preferably of the piston and cylinder type having a vertical shaft motor directly connected to the compressor crankshaft, all of which is contained within a hermetically sealed casing. The compressor casing is provided with supporting lugs 84 preferably four in number although any other number may be employed. These lugs rest on suitable members 9 preferably of resilient nature secured to the raised platform portion of base 1. The members 9 are placed preferably at the sides of the substantially square recess 5 thereby permitting the arms 84 to be of relatively short length.

Any suitable insulation such as 86 may be placed around the sides of the condenser-evaporator assembly and also a suitable cover 87 in the form of insulation or other suitable material is placed over the space between partition 75 and rear wall 72 of the condenser-evaporator assembly as shown in Fig. 8. The result is that air may flow inwardly through opening 17 as shown in Fig. 9 and thence downwardly over the compressor 83 to be propelled through fan scroll 24 by a suitable blower driven by motor 88. The air from the fan flows upwardly through passage 31, Figs. 4 and 6, and thence through filter 54 and over condenser 90 disposed within the sheet metal condenser-evaporator assembly, the air then being turned outwardly beneath cover 87, Fig. 9, to be discharged to the outside atmosphere through passages 18, Figs. 1 and 7.

The room air is circulated through fan scroll 29 upwardly through passage 42 and thence through filter 60 and over an evaporator 91. The room air then passes directly upwardly through the uncovered portion of the condenser-evaporator assembly to the room.

The path of outside air flow may be maintained separate from the path of room air by any suitable means such as a cabinet or compressor enclosure but such features do not constitute a part of my present invention except insofar as my improved sheet metal arrangement assists in defining the air passages within the unit.

From the foregoing disclosure it is seen that I have provided a very desirable arrangement and form of elements adapted to cooperate in such a manner as to effect a simple, strong and economical structure adapted to perform in an effective manner not only its structural supporting functions for the operating mechanisms but at the same time perform the function of providing walls of certain flow passages.

It will of course be understood by those skilled in the art that various changes may be made in the details of construction and arrangement of parts without departing from the spirit of the invention as set forth in the appended claims.

I claim:

1. An air conditioning apparatus comprising, in combination, a base, a sheet metal standard supported thereon, a heat exchange element, and a fan casing through which air is circulated for said element including a sheet metal scroll plate, a cover for one end of said scroll plate, and means for securing the other end of said scroll plate to the side of said standard whereby the latter constitutes a combined support and end cover for said scroll plate.

2. An air conditioning apparatus comprising, in combination, a base, a sheet metal end standard supported thereon, an air duct supported by and projecting laterally from said standard, and a fan casing supported by said duct in depending relation therefrom.

3. An air conditioning apparatus comprising, in combination, a base, a sheet metal end standard supported thereon, an air duct secured to the side of said standard, and a fan casing secured to the side of said standard and also to said duct.

4. An air conditioning apparatus comprising, in combination, a base, a sheet metal end standard supported thereon, an air duct secured to the side of said standard, and a fan casing secured to the side of said standard and also to said duct, said sheet metal standard forming an end closure both for said duct and fan casing.

5. An air conditioning apparatus comprising, in combination, a pair of sheet metal end standards, a pair of sheet metal air ducts secured to said standards and having relatively deep but comparatively thin sheet metal sides thereby to form a substantially beam-like construction of the ducts between said standards, and an evaporator and condenser supported over said ducts.

6. An air conditioning apparatus comprising, in combination, a pair of sheet metal end standards, a pair of sheet metal air ducts secured to said standards and having relatively deep but comparatively thin sheet metal sides thereby to form a substantially beam-like construction of the ducts between said standards, an evaporator and condenser supported over said ducts, and a fan casing supported by at least one of said ducts in depending relation therefrom.

7. An air conditioning apparatus comprising, in combination, a base, a pair of sheet metal end standards supported thereon, a pair of substantially parallel sheet metal air ducts supported by and between said standards, and fan casings secured to the sides of each of said standards and communicating with said ducts, said fan casings being of the scroll type with a common axis but with their tangential outlets extending in different angular directions for communication respectively with said ducts.

8. An air conditioning apparatus comprising, in combination, a self-contained sheet metal supporting unit including end standards, ducts and fan casings, and a condenser-evaporator assembly formed separately from said supporting unit but resting on the top thereof over said ducts whereby air flow therethrough may pass over the condenser and evaporator.

9. An air conditioning apparatus comprising, in combination, a self-contained sheet metal supporting unit including end standards, ducts and fan casings, and a condenser-evaporator assembly formed separately from said supporting unit but resting on the top thereof over said ducts whereby air flow therethrough may pass over the condenser and evaporator, said condenser-evaporator assembly having portions telescopically arranged with said supporting unit.

10. An air conditioning apparatus comprising, in combination, means forming air ducts, means for supporting the same, a condenser and evaporator, means forming a walled unit containing said condenser and evaporator separate from said ducts, and means for supporting said unit over said ducts to allow flow of air through said ducts and over the condenser and evaporator.

11. An air conditioning apparatus comprising, in combination, a base, sheet metal end standards supported on said base and of substantially the same width thereof, and ducts supported by and between said standards.

12. An air conditioning apparatus comprising, in combination, a base, a backplate, sheet metal end standards supported on said base and secured to said backplate, and means forming air passages supported by said sheet metal end standards.

13. An air conditioning apparatus comprising, in combination, a base, a backplate secured thereto and having inlet and outlet air openings, sheet metal end standards supported on said base and secured to said backplate, and means forming air passages supported by and between said standards, at least one of said air passages being adapted for communication with both said inlet and outlet openings in said backplate.

14. An air conditioning apparatus comprising, in combination, a base, a backplate secured thereto and having inlet and outlet air openings therein, sheet metal standards of substantially the same width as said base and supported thereon and secured thereto and to said backplate, one of said standards being disposed substantially at the end of said base and the other standard at a point intermediate the length of the base whereby said intermediate standard provides an intermediate vertical support for said backplate while said backplate assists in holding said standard vertically.

15. Air conditioning apparatus comprising, in combination, a base, a backplate secured to said base, and sheet metal standards supported on said base transversely thereof, said backplate and standards being secured together substantially at right angles to each other to provide a mutual supporting and strengthening relation therebetween.

16. Air conditioning apparatus comprising, in combination, a sheet metal base having sides supporting a raised platform in which a centrally depressed portion is provided, sheet metal end standards supported on the raised platform portion of said base, and air ducts supported by and between said standards.

17. Air conditioning apparatus comprising, in combination, a sheet metal base having sides supporting a raised platform in which a centrally depressed portion is provided, sheet metal end standards supported on the raised platform portion of said base, air ducts supported by and between said standards to form a unit therewith, and a sheet metal backplate secured to one side of said base and also secured to said unit.

18. Air conditioning apparatus comprising, in combination, a sheet metal base having sides supporting a raised platform in which a centrally depressed recess is formed thereby to provide a base having in cross-section a substantially double channel formation.

19. Air conditioning apparatus comprising, in combination, a sheet metal base having sides supporting a raised platform in which a centrally depressed recess is formed thereby to provide a base having in cross-section a substantially double channel formation, said depression having a necked portion to provide a compressor supporting arrangement.

20. An air conditioning apparatus having a compressor comprising, in combination, a sheet metal base having sides supporting a raised platform in which a longitudinally extending centrally depressed portion is provided thereby to form a substantially double channel structure in the base, one end of said depression having in plan view a substantially multiple sided form to provide compressor supports on the raised platform more nearly adjacent the compressor.

21. An air conditioning apparatus comprising, in combination, a sheet metal base having sides supporting a raised platform in which a central depression is formed to provide a substantially double channel structure, and a semi-raised platform projecting upwardly from said depression to provide a motor support.

22. An air conditioning apparatus comprising, in combination, a sheet metal base having sides supporting a raised platform in which a central depression is formed to provide a substantially double channel structure, and a semi-raised platform projecting upwardly from said depression and connecting into the channel formation on each side of the base to provide a motor support.

23. An air conditioning apparatus comprising, in combination, a base, a sheet metal vertical standard supported thereon, a heat exchange element supported by said standard, a sheet metal fan scroll through which air is circulated for said heat exchange element, said scroll being supported by said standard entirely between the vertical edges thereof, a fan rotor within said scroll, and a fan motor located externally of the scroll.

ALFRED WEILAND.